(12) United States Patent
Norton

(10) Patent No.: US 9,750,374 B1
(45) Date of Patent: Sep. 5, 2017

(54) CUTTING BOARD ASSEMBLY

(71) Applicant: Stan Norton, Centralia, WA (US)

(72) Inventor: Stan Norton, Centralia, WA (US)

( * ) Notice: Subject to any disclaimer, the term of this patent is extended or adjusted under 35 U.S.C. 154(b) by 0 days.

(21) Appl. No.: 15/049,139

(22) Filed: Feb. 21, 2016

(51) Int. Cl.
*B23Q 1/00* (2006.01)
*A47J 47/00* (2006.01)

(52) U.S. Cl.
CPC ................................. *A47J 47/005* (2013.01)

(58) Field of Classification Search
CPC ............................... A47J 47/005; A47J 47/00
USPC ...................................................... 220/8, 559
See application file for complete search history.

(56) References Cited

U.S. PATENT DOCUMENTS

| 872,837 | A | * | 12/1907 | Mio | .................. | A21B 3/13 |
| | | | | | | 220/8 |
| 2,751,951 | A | * | 6/1956 | Strathaus | .............. | A47J 47/005 |
| | | | | | | 269/15 |
| 2,824,588 | A | | 2/1958 | Lyon | | |
| 3,596,354 | A | | 8/1971 | Emerson | | |
| D375,661 | S | | 11/1996 | Ross et al. | | |
| 6,502,490 | B1 | | 1/2003 | Krawick | | |
| 8,205,545 | B2 | | 6/2012 | Heck et al. | | |
| 8,347,782 | B2 | | 1/2013 | Nuri | | |
| 2011/0296695 | A1 | | 12/2011 | Temiz | | |
| 2013/0312581 | A1 | | 11/2013 | St. Pierre et al. | | |
| 2014/0109738 | A1 | | 4/2014 | Schwartz | | |

FOREIGN PATENT DOCUMENTS

| WO | WO2013166100 | 11/2013 |
| WO | WO2014066582 | 5/2014 |

* cited by examiner

*Primary Examiner* — Monica Carter
*Assistant Examiner* — Nirvana Deonauth

(57) ABSTRACT

A cutting board assembly for cutting a fruit includes a base that may be positioned on a support surface. The base may support a fruit. A clamp is slidably coupled to the base and the clamp may be manipulated. The clamp engages the fruit when the fruit is positioned on the base. Thus, the fruit is restrained on the base.

10 Claims, 4 Drawing Sheets

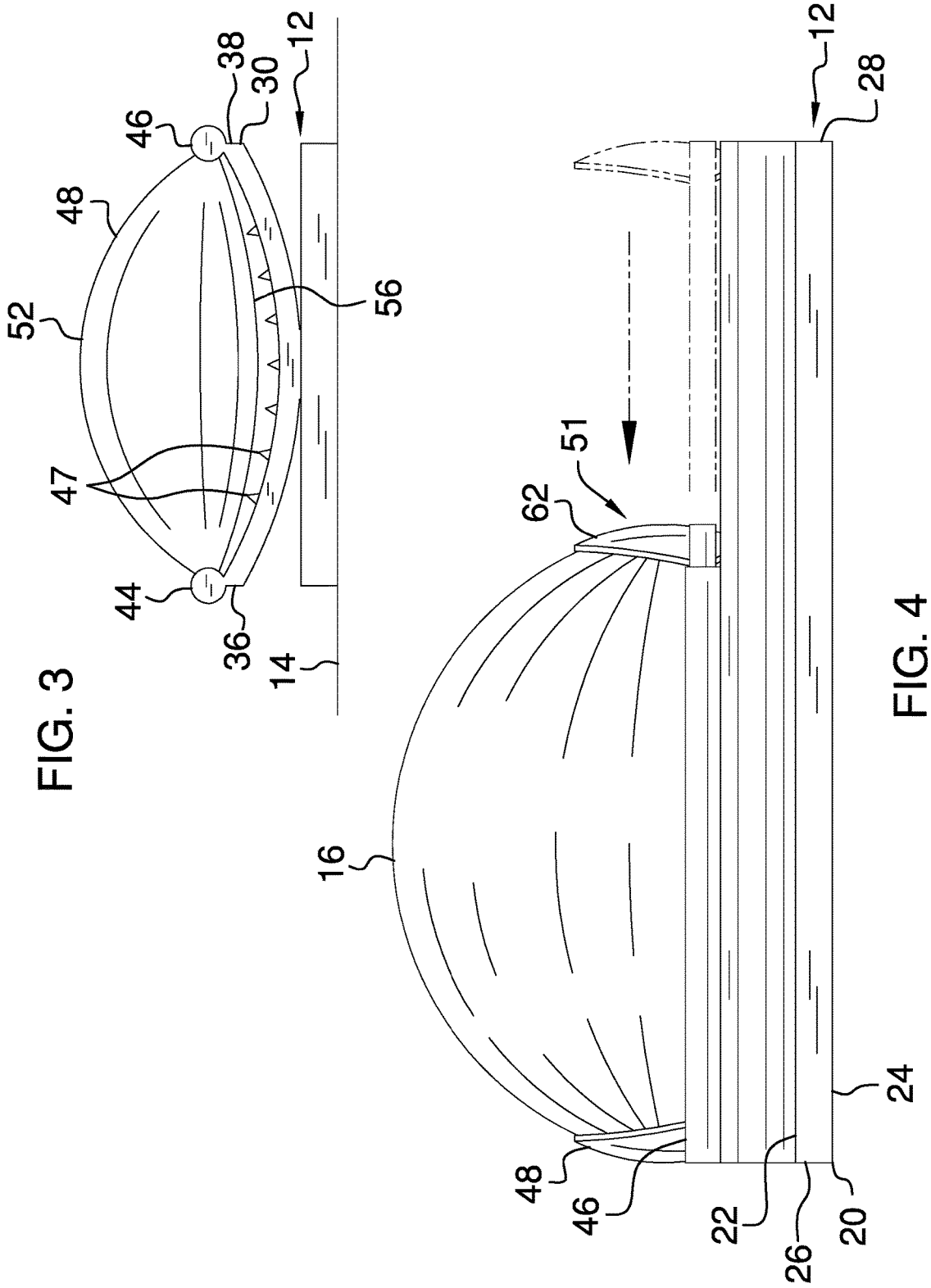

CUTTING BOARD ASSEMBLY

BACKGROUND OF THE DISCLOSURE

Field of the Disclosure

The disclosure relates to cutting board devices and more particularly pertains to a new cutting board device for restraining a fruit to be cut.

SUMMARY OF THE DISCLOSURE

An embodiment of the disclosure meets the needs presented above by generally comprising a base that may be positioned on a support surface. The base may support a fruit. A clamp is slidably coupled to the base and the clamp may be manipulated. The clamp engages the fruit when the fruit is positioned on the base. Thus, the fruit is restrained on the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a left side view of an embodiment of the disclosure.

FIG. 4 is a front view of an embodiment of the disclosure.

DESCRIPTION OF THE PREFERRED EMBODIMENT

Figure 1:
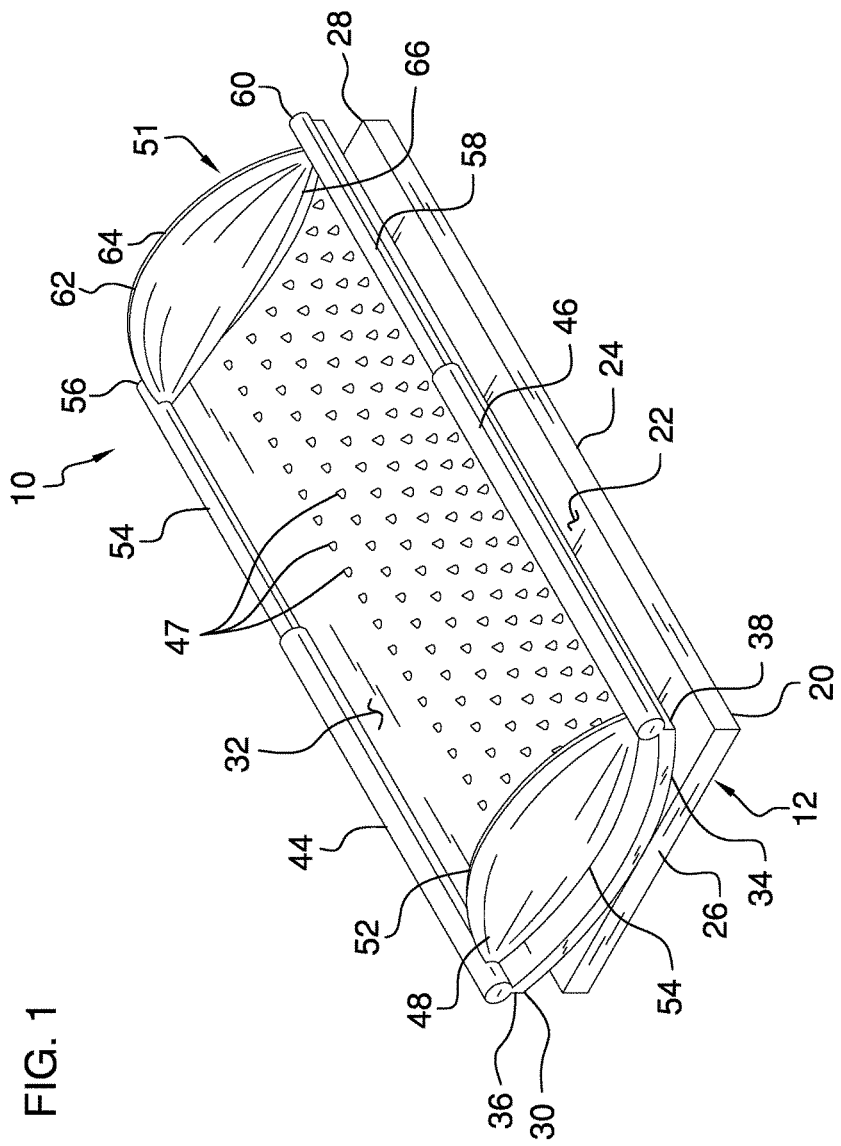
FIG. 1 is a top perspective view of a cutting board assembly according to an embodiment of the disclosure.
Figure 2:
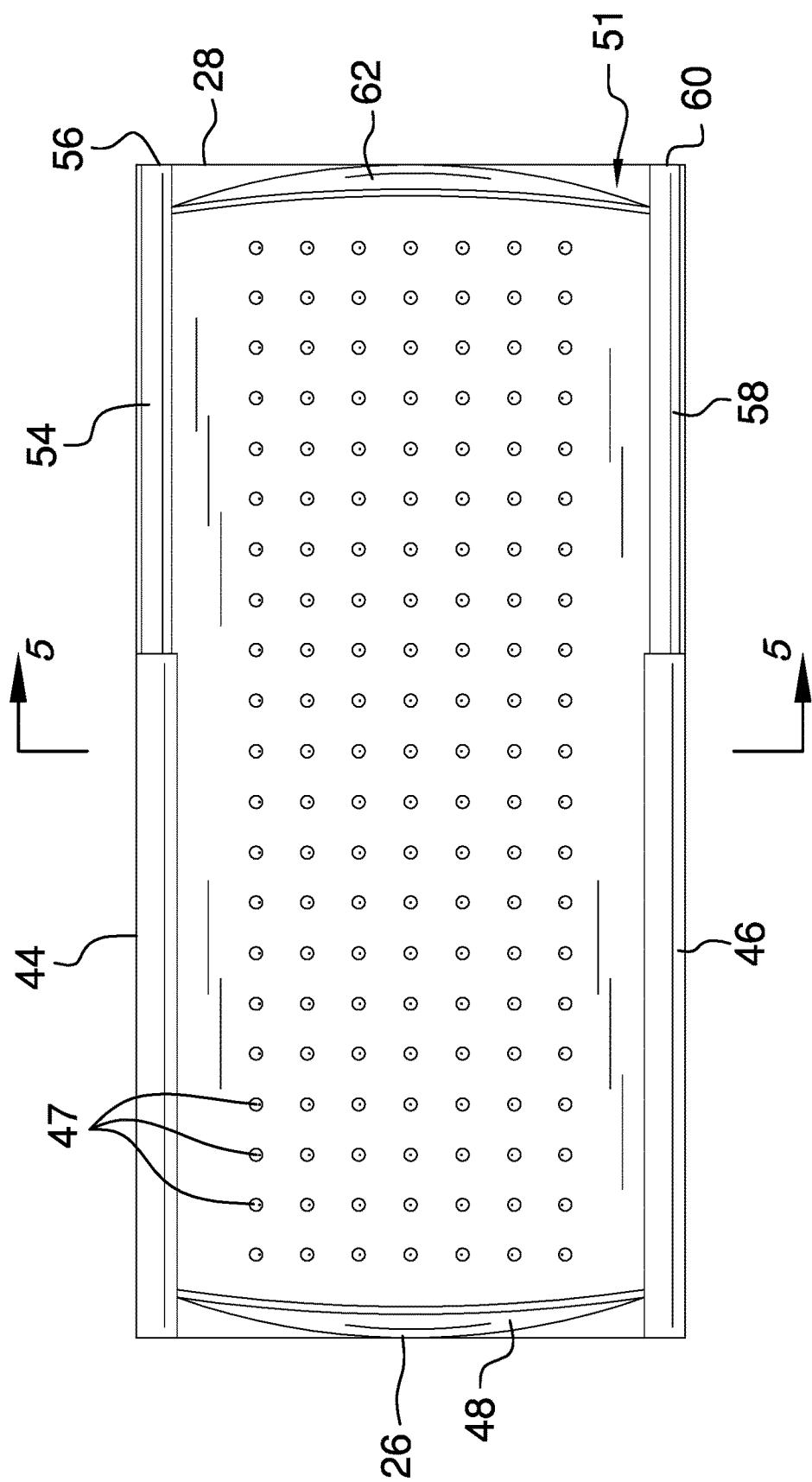
FIG. 2 is a top view of an embodiment of the disclosure.
Figure 5:
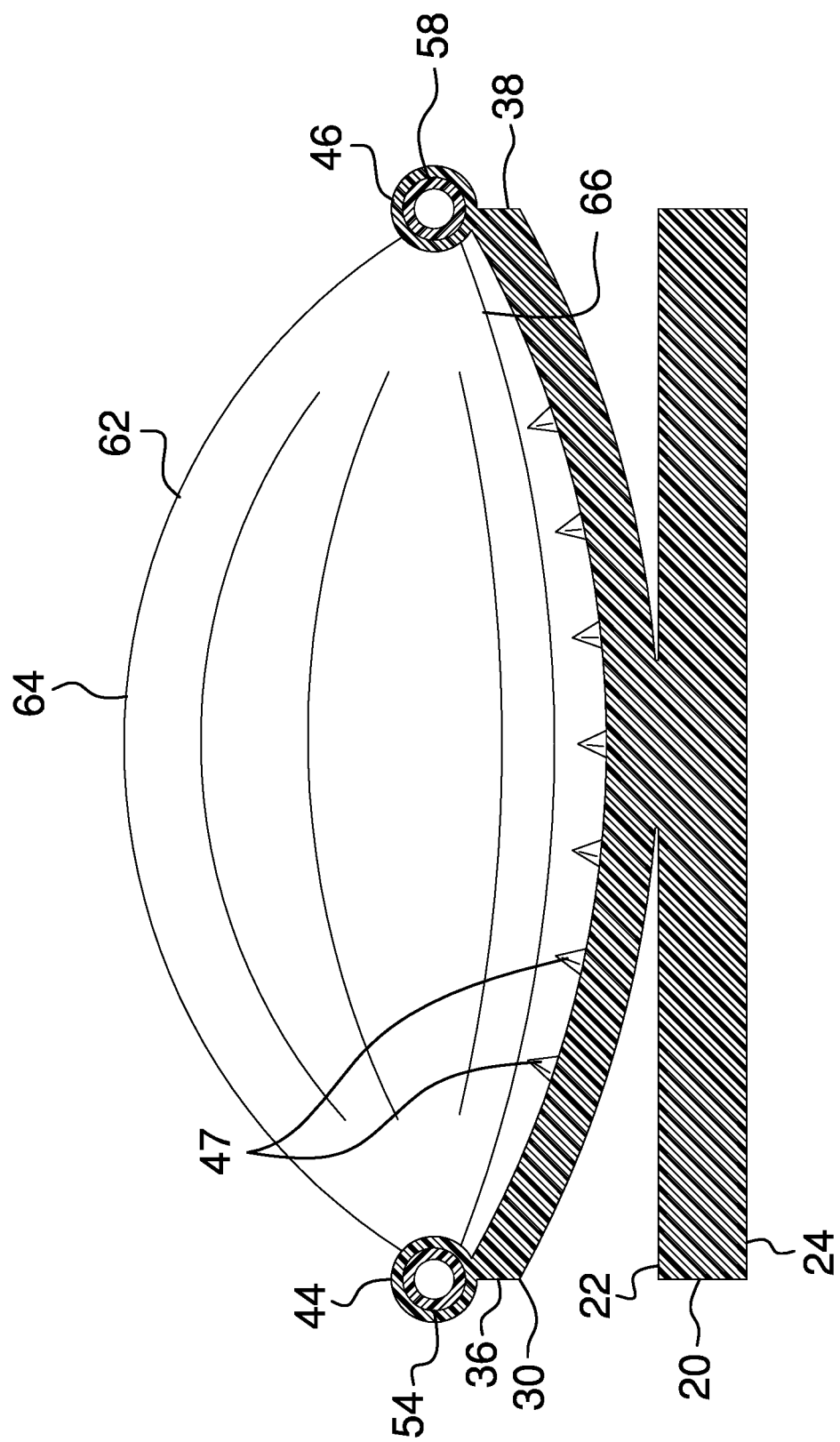
FIG. 5 is a cross sectional view taken along line 5-5 of FIG. 2 of an embodiment of the disclosure.

With reference now to the drawings, and in particular to FIGS. 1 through 5 thereof, a new cutting board device embodying the principles and concepts of an embodiment of the disclosure and generally designated by the reference numeral 10 will be described.

As best illustrated in FIGS. 1 through 5, the cutting board assembly 10 generally comprises a base 12 that may be positioned on a support surface 14. The support surface 14 may comprise a table or the like. A fruit 16 may be positioned on the base 12. The fruit 16 may comprise a melon or the like.

The base 18 comprises a panel 20 that has a top surface 22, a bottom surface 24, a first end 26 and a second end 28. The bottom surface 24 may be positioned the support surface 14. The panel 20 is elongated between the first end 26 and the second end 28.

A saddle 30 is provided that has an upper surface 32, a lower surface 34, a first lateral edge 36 and a second lateral edge 38. The fruit 16 may be placed on the upper surface 32. The upper surface 32 is concavely arcuate between the first lateral edge 36 and the second lateral edge 38. The lower surface 34 is coupled to the top surface 22 of the base 18. The saddle 30 extends substantially between the first end 26 and the second end 28.

The saddle 30 includes a first tube 44 coupled to an intersection of the first lateral edge 36 and the upper surface 32. The first tube 44 extends from the first end 26 toward the second end 28. The saddle 30 includes a second tube 46 coupled to an intersection of the second lateral edge 38 and the upper surface 32. The second tube 46 extends from the first end 26 toward the second end 28.

A plurality of spikes 47 is provided and each of the spikes 47 is coupled to and extends upwardly from the upper surface 32. The spikes 47 are spaced apart from each other and are distributed on the upper surface 32. The spikes 47 pierce the fruit 16 when the fruit 16 is positioned on the saddle 30. Thus, the fruit 16 is inhibited from sliding on the saddle 30.

A first stop 48 is coupled between the first tube 44 and the second tube 46. The first stop 48 is positioned adjacent to the first end 26 and the first stop 48 has a top edge 52 and a bottom edge 54. Each of the top edge 52 and the bottom edge 54 is concavely arcuate with respect to a center of the first stop 48. Thus, the first stop 48 has an ovoid shape.

The bottom edge 54 is spaced from the upper surface 32 of the saddle 30. The fruit 16 abuts the first stop 48 when the fruit 16 is positioned on the saddle 30. The first stop 48 may be concavely arcuate between the first tube 44 and the second tube 46. Thus, the first stop 48 may form a bowl.

A clamp 51 is slidably coupled to the base 18. Thus, the clamp 51 may be manipulated. The clamp 51 engages the fruit 16 when the fruit 16 is positioned on the base 18. Thus, the fruit 16 is restrained on the base 18.

The clamp 51 comprises a first rod 54 that is slidably positioned within the first tube 44. The first rod 54 has a distal end 56 with respect to the first tube 44. The distal end 56 is directed toward the second end 28 of the panel 20. A second rod 58 is slidably positioned within the second tube 46 and the second rod 58 has a distal end 60 with respect to the second tube 46. The distal end 60 of the second tube 46 is directed toward the second end 28 of the panel 20.

A second stop 62 is coupled between the distal end 56 of the first rod 54 and the distal end 60 of the second rod 58. The second stop 62 has an upper edge 64 and a lower edge 66. Each of the upper edge 64 and the lower edge 66 is concavely arcuate with respect to a center of the second stop 62. Thus, the second stop 62 has an ovoid shape.

The lower edge 66 is spaced from the upper surface 32 of the saddle 30. The second stop 62 is selectively urged toward the first stop 48. The second stop 62 compresses the fruit 16 between the first stop 48 and the second stop 62 thereby facilitating the fruit 16 to be cut. The second stop 62 may be concavely arcuate between the first rod 54 and the second rod 58. Thus, the second stop 62 may form a bowl.

In use, the fruit 16 is placed on the saddle 30 such that the fruit 16 abuts the first stop 48. The spikes 47 located beneath the fruit 16 pierce the fruit 16. Thus, the fruit 16 is inhibited from sliding on the saddle 30. The second stop 62 is urged toward the fruit 16. Thus, the second stop 62 compresses the fruit 16 between the first stop 48 and the second stop 62. The fruit 16 is cut while the fruit 16 is restrained on the saddle 30. The first stop 48 and the second stop 62 facilitate a user to use both hands to cut the fruit 16. Thus, the fruit 16 may be cut with minimal risk of injury to the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cutting board assembly configured to restrain a melon for cutting, said assembly comprising:
   a base being configured to be positioned on a support surface, said base being configured to support a fruit, said base comprising
      a first rod having a distal end,
      a second rod having a distal end, and
      a saddle having an upper surface; and
   a clamp being slidably coupled to said base wherein said clamp is configured to be manipulated, said clamp being configured to engage the fruit when the fruit is positioned on said base thereby facilitating the fruit to be restrained on said base, said clamp comprises
      a first stop, and
      a second stop being coupled between said distal end of said first rod and said distal end of said second rod, said second stop having an upper edge and a lower edge, each of said upper edge and said lower edge being concavely arcuate with respect to a center of said second stop such that said second stop has an ovoid shape, said lower edge being spaced from said upper surface of said saddle, said second stop being selectively urged toward said first stop wherein said second stop is configured to compress the fruit between said first stop and said second stop thereby facilitating the fruit to be cut.

2. The assembly according to claim 1, wherein said base comprises a panel having a top surface, a bottom surface, a first end and a second end, said bottom surface being configured to be positioned on the support surface, said panel being elongated between said first end and said second end.

3. The assembly according to claim 2, further comprising a saddle having an upper surface, a lower surface, a first lateral edge and a second lateral edge, said lower surface being coupled to said top surface of said base, said saddle extending substantially between said first end and said second end, said upper surface being configured to have the fruit placed thereon.

4. The assembly according to claim 3, wherein said saddle includes a first tube being coupled to an intersection of said first lateral edge and said upper surface, said first tube extending from said first end toward said second end.

5. The assembly according to claim 3, wherein said saddle includes a second tube being coupled to an intersection of said second lateral edge and said upper surface, said second tube extending from said first end toward said second end.

6. The assembly according to claim 3, further comprising a plurality of spikes, each of said spikes being coupled to and extending upwardly from said upper surface, said spikes being spaced apart from each other and being distributed on said upper surface, said spikes being configured to pierce the fruit when the fruit is positioned on said saddle thereby facilitating the fruit to be inhibited from sliding on said saddle.

7. A cutting board assembly configured to restrain a melon for cutting, said assembly comprising: a base being configured to be positioned on a support surface, said base being configured to support a fruit; a clamp being slidably coupled to said base wherein said clamp is configured to be manipulated, said clamp being configured to engage the fruit when the fruit is positioned on said base thereby facilitating the fruit to be restrained on said base; said base including a panel having a top surface, a bottom surface, a first end and a second end, said bottom surface being configured to be positioned on the support surface, said panel being elongated between said first end and said second end; a saddle having an upper surface, a lower surface, a first lateral edge and a second lateral edge, said lower surface being coupled to said top surface of said base, said saddle extending substantially between said first end and said second end, said upper surface being configured to have the fruit placed thereon, said saddle including a first tube being coupled to an intersection of said first lateral edge and said upper surface, said first tube extending from said first end toward said second end; said saddle including a second tube being coupled to an intersection of said second lateral edge and said upper surface, said second tube extending from said first end toward said second end; and a first stop being coupled between said first tube and said second tube, said first stop being positioned adjacent to said first end, said first stop having a top edge and a bottom edge, each of said top edge and said bottom edge being concavely arcuate with respect to a center of said first stop such that said first stop has an ovoid shape, said bottom edge being spaced from said upper surface of said saddle, said first stop being configured to abut the fruit when the fruit is positioned on said saddle.

8. The assembly according to claim 4, wherein said first rod is slidably positioned within said first tube, said first rod having a distal end with respect to said first tube, said distal end being directed toward said second end of said panel.

9. The assembly according to claim 5, said second rod is slidably positioned within said second tube, said second rod having a distal end with respect to said second tube, said distal end of said second tube being directed toward said second end of said panel.

10. A cutting board assembly configured to restrain a melon for cutting, said assembly comprising:
    a base being configured to be positioned on a support surface, said base being configured to support a fruit, said base comprising:
       a panel having a top surface, a bottom surface, a first end and a second end, said bottom surface being configured to be positioned on the support surface, said panel being elongated between said first end and said second end,
       a saddle having an upper surface, a lower surface, a first lateral edge and a second lateral edge, said lower surface being coupled to said top surface of said base, said saddle extending substantially between said first end and said second end, said saddle including a first tube being coupled to an intersection of said first lateral edge and said upper surface, said first tube extending from said first end toward said second end, said saddle including a second tube being coupled to an intersection of said second lateral edge and said upper surface, said second tube extending from said first end toward said second end, said upper surface being configured to have the fruit placed thereon,
- a plurality of spikes, each of said spikes being coupled to and extending upwardly from said upper surface, said spikes being spaced apart from each other and being distributed on said upper surface, said spikes being configured to pierce the fruit when the fruit is positioned on said saddle thereby facilitating the fruit to be inhibited from sliding on said saddle, and
- a first stop being coupled between said first tube and said second tube, said first stop being positioned adjacent to said first end, said first stop having a top edge and a bottom edge, each of said top edge and said bottom edge being concavely arcuate with respect to a center of said first stop such that said first stop has an ovoid shape, said bottom edge being spaced from said upper surface of said saddle, said first stop being configured to abut the fruit when the fruit is positioned on said saddle; and
- a clamp being slidably coupled to said base wherein said clamp is configured to be manipulated, said clamp being configured to engage the fruit when the fruit is positioned on said base thereby facilitating the fruit to be restrained on said base, said clamp comprising:
  - a first rod being slidably positioned within said first tube, said first rod having a distal end with respect to said first tube, said distal end being directed toward said second end of said panel,
  - a second rod being slidably positioned within second tube, said second rod having a distal end with respect to said second tube, said distal end of said second tube being directed toward said second end of said panel, and
  - a second stop being coupled between said distal end of said first rod and said distal end of said second rod, said second stop having an upper edge and a lower edge, each of said upper edge and said lower edge being concavely arcuate with respect to a center of said second stop such that said second stop has an ovoid shape, said lower edge being spaced from said upper surface of said saddle, said second stop being selectively urged toward said first stop wherein said second stop is configured to compress the fruit between said first stop and said second stop thereby facilitating the fruit to be cut.

\* \* \* \* \*